Nov. 23, 1937.  J. E. MITCHELL  2,100,303
COTTON CLEANING AND RECLAIMING MACHINE
Filed May 18, 1936
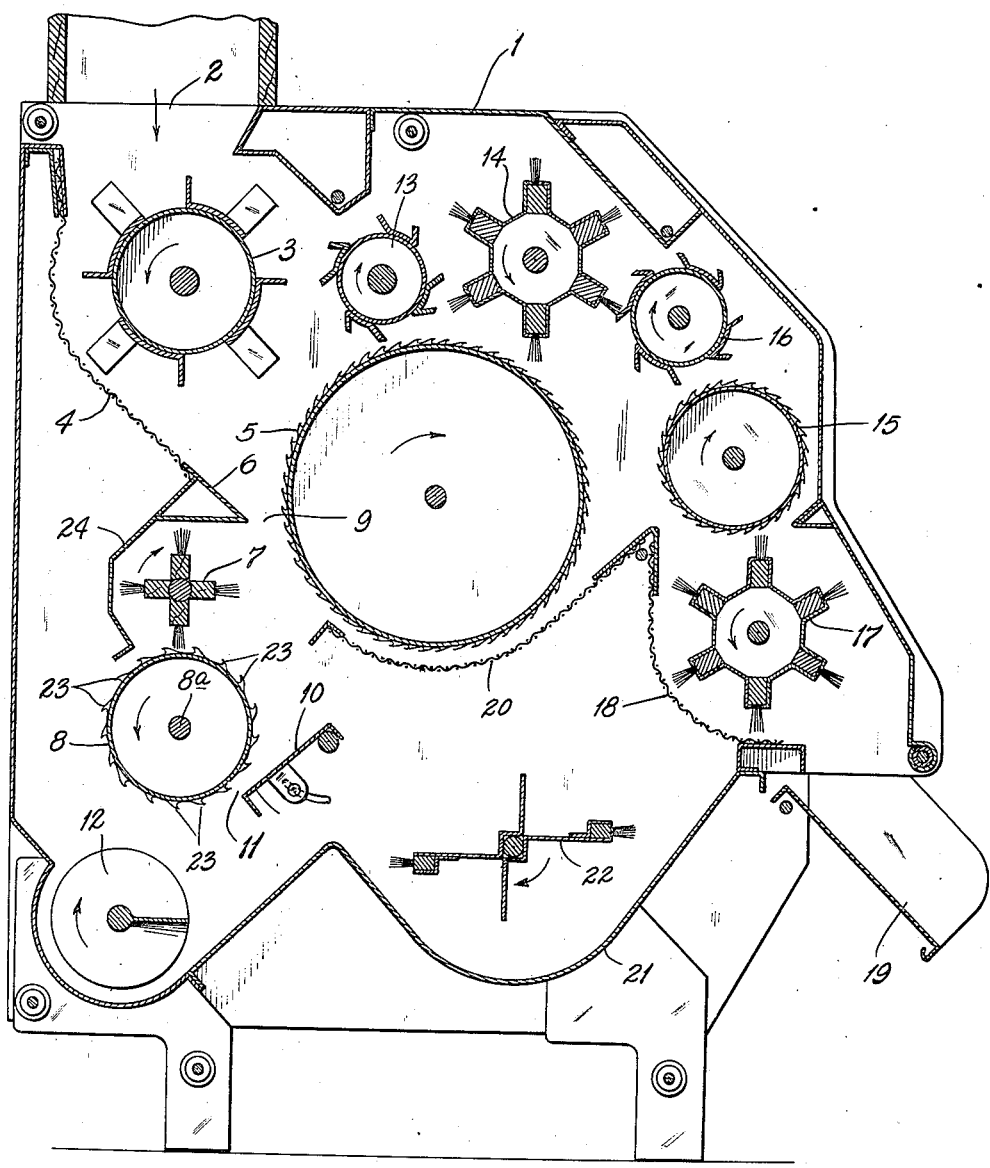
INVENTOR:
JOHN E. MITCHELL,
By Bruce D. Elliott
ATTORNEY.

Patented Nov. 23, 1937

2,100,303

UNITED STATES PATENT OFFICE 2,100,303

COTTON CLEANING AND RECLAIMING MACHINE

John E. Mitchell, Dallas, Tex.

Application May 18, 1936, Serial No. 80,241

12 Claims. (Cl. 19—37)

The general object of this invention is to provide novel means for reclaiming cotton, usually in the form of cotton locks, escaping with hulls past the main extracting cylinder of a cotton extracting and cleaning machine.

Stated more in detail, it is an object of the invention to provide, in combination with the main extracting cylinder, a reclaiming cylinder to act upon the hulls and lock cotton escaping past the extracting cylinder, to associate with the reclaiming cylinder a hull board so positioned as to define a space between its lower edge and the reclaiming cylinder through which small hulls and other trash are discharged, with its upper edge far enough away from the reclaiming cylinder to prevent locks of cotton being thrown over, while permitting large hulls or flared bolls being thrown over by impact therewith of the teeth of the reclaiming cylinder.

Another object of the invention is to provide, in a machine of the character described, a reclaiming saw cylinder in which the teeth are spaced at a greater distance apart than the teeth of the main extracting cylinder, whereby to increase the impact action of the teeth with the hulls to cause the latter to be thrown upward over the top of the cooperating hull board, while at the same time affording sufficient points of contact for engaging and removing cotton locks mixed with the hulls.

Another object of the invention is to provide, in a machine of the character described, a reclaiming saw cylinder of relatively large diameter as compared with the size of reclaiming cylinders heretofore employed by me, and rotating in a direction opposite to that of the main extracting cylinder at a slower peripheral speed, and to combine therewith a doffer, rotating in an opposite direction to the reclaiming cylinder, to remove cotton therefrom and project the cotton onto the teeth of the main extracting cylinder.

Another object of the invention is to provide, in combination with the main extracting cylinder of a cotton extracting and cleaning machine, a reclaiming saw cylinder having a cooperating doffer rotating in the same direction as the extracting cylinder, a slide for directing mixed cotton and hulls fed into the machine against the rising side of the extracting cylinder, and to so position the parts that the lower edge of said slide and the down-going side of said doffer will define, with the rising side of the extracting cylinder, a space for the passage of hulls and cotton locks to the reclaiming cylinder.

Other objects of the invention relate to details of construction and to combinations and arrangements of parts, which will be more clearly understood from the detailed description of the invention to follow.

In order that the operation and advantage of the reclaiming feature of the present invention may be better understood, a brief reference to certain of my own prior patented machines and the operation thereof is deemed desirable.

To those skilled in the art, a saw cylinder for acting upon a stream of mixed cotton and hulls, in combination with a kicker roll for knocking back the hulls, is known as an "extracting cylinder"; while a supplemental saw cylinder for recovering small lock cotton escaping with the hulls past the extracting cylinder, and which does not have a kicker roll, is known as a "reclaiming cylinder". The reclaiming saw cylinders, however, as disclosed in my prior Patent No. 1,613,242, have, in common with extracting cylinders, some means for doffing cotton recovered from the hulls.

In one of my early machines, shown and described in Patent No. 1,030,913, there is provided a single saw cylinder, and at the period of the grant of this patent, when cotton was mostly hand-picked, this saw cylinder served not only to extract the main body of cotton from the relatively small amount of hulls or bolls, but its lower hull board arrangement also enabled the lower portion of the same cylinder to recover small lock cotton escaping with the hulls through the gap (29) past the upper hull board. Thus, in this early model of the Mitchell extracting machines, the single saw cylinder served both as an extracting and reclaiming cylinder.

For present-day requirements, when cotton is harvested more roughly, the percentage of hulls is so great that the machine of the patent referred to is altogether inadequate, either for extracting the main bulk of cotton from the mass of hulls, or for recovering the locks of cotton escaping with the hulls. To increase both the extracting and reclaiming capacity of machines of this character, I provided, in later model machines, a larger extracting cylinder and an independent reclaiming saw for recovering small lock cotton from the hulls escaping past the lifting side of the extracting cylinder, and associated with this reclaiming cylinder a series of yielding members, or brushes, for forcing the cotton locks into engagement with the teeth of the reclaiming saws while permitting the discharge of hulls by centrifugal action, as disclosed in Patent No. 1,613,242, referred to.

The reclaiming saw feature of this improved machine was very successful in the recovery of the small lock cotton; but it was found that any hulls that fail to discharge through the gaps following the brushes, and are carried with the recovered cotton past these discharge spaces, are forced to pass through the narrow space defined by the teeth of the reclaiming cylinder on one side and the teeth of the extracting cylinder on the other, which latter serves to doff the recovered cotton from the teeth of the reclaiming cylinder, with the result that the action of the teeth of the two cylinders on the hulls resulted in the hulls being more or less mashed, cut or shaled.

Another objection incident to this prior construction is that the brushes cooperating with the reclaiming cylinder wear more or less, and are otherwise damaged in use to such an extent that it is necessary to replace them from time to time, and unless replaced soon enough there is an unnecessary waste of cotton.

To obviate the two objections referred to, and at the same time render the recovery of small lock cotton from the hulls more effective, my present invention utilizes a reclaiming saw cylinder as large in diameter as that formerly used for the extracting cylinder in the early Mitchell machine of Patent No. 1,030,913. It is rotated in the same direction as the small reclaiming cylinder of Patent No. 1,613,242, that is, in the opposite direction to that of the rotation of the main extracting cylinder, but in lieu of the brushes of this later patent, and in lieu of having the reclaiming cylinder in doffing relation to the extracting cylinder, the relatively large reclaiming cylinder now employed is provided with a hull board defining an adjustable space past the lower rising side of the cylinder which functions in a manner similar to the lower hull board (22) of the earlier patent referred to; but since this cylinder does not have to function as an extracting cylinder, it is provided with a special arrangement of teeth (hereinafter more fully described) that makes it especially effective for discharging hulls over the top of the hull board and for recovering lock cotton escaping with the hulls from the extracting cylinder above it, and is provided with a separate doffing cylinder which removes the recovered cotton from the upper portion of the reclaiming cylinder and redelivers it to the rising side of the extracting cylinder.

The invention is illustrated in the accompanying drawing in which the figure is a longitudinal sectional view through a machine constructed according to my invention, the conventional driving means being omitted, and the directions of rotations of the various elements being indicated by arrows applied thereto.

Referring now to the drawing, the numeral 1 indicates, generally, the casing of the machine, in the top of which is an opening, 2, through which mixed cotton and hulls are delivered into the machine from a distributor in the usual manner. Feeding mechanism of any conventional type may be employed for this purpose if desired. Located below the opening 2 is a combined directing and beating cylinder, 3, which rotates in sufficiently close proximity to a curved screen, 4, to force the cotton and hulls fed into the machine through the opening 2 over said screen to cause dirt and small trash to be removed therefrom, while at the same time its blades operate by impact to break apart unopened bolls and propel the cotton and hulls at relatively high velocity toward the main extracting saw cylinder, 5. At the lower end of the screen 4, I provide a slide, 6, which is inclined toward the periphery of the extracting cylinder 5, to direct the cotton and hulls, propelled over the same by the directing cylinder 3, against the rising side of the extracting cylinder 5. Located below the slide 6 is a doffing cylinder, 7, rotating in the same direction as the extracting cylinder 5 and in an opposite direction to a reclaiming saw cylinder, 8, located immediately beneath it and with which it is in doffing relation. The lower edge of the slide 6 and the down-going side of the doffer 7, define, with the rising side of the extracting cylinder 5, a space, 9, through which the hulls and small lock cotton escape past the extracting cylinder to the reclaiming cylinder 8. Cooperating with the reclaiming cylinder 8 is an adjustable hull board, 10, which extends beneath the lower rising side of the reclaiming cylinder. The lower end of this hull board is adjustable toward and from the reclaiming cylinder so as to increase or decrease the space, 11, defined by its lower end and the teeth of the reclaiming cylinder, through which space hulls of various sizes are discharged.

The hull board 10 extends at an incline to carry its top far enough away from the reclaiming cylinder to prevent the small lock cotton being thrown through the outlet provided over the top of the board; but it is not too far away to prevent the teeth of the reclaiming cylinder, when spaced far enough apart, from throwing hulls or flared bolls over the top of the board, which hulls and bolls are too large to slide through the space 11 between the lower edge of the hull board and the reclaiming cylinder. In practice the top of the hull board will be substantially in the horizontal plane of the axis 8ᵃ of the reclaiming cylinder. However, experience alone will dictate the proper height of the hull board and the distance of its upper end from the side of the reclaiming cylinder.

The space 9, in which the mixed cotton and hulls are directed against the rising side of the extracting cylinder, and through which the hulls and small lock cotton escape to the reclaiming cylinder below, is wide enough to permit the hulls, flared bolls, and other extraneous matter to fall freely past the extracting cylinder, but the only cotton that escapes with the hulls to the reclaiming cylinder are the small locks which bounce off the teeth of the extracting cylinder with the hulls. To recover these small locks of cotton from the hulls without shaling or cutting the hulls, I employ a reclaiming saw cylinder of larger diameter than that heretofore used and associate the hull board 10 therewith. The advantages of this arrangement will be outlined more at length later on. Dirt and trash passing through the screen 4 and hulls discharged through opening 11 fall into a trash conveyor 12 at the bottom of the machine and are discharged therefrom. The other parts of the machine illustrated do not constitute, of themselves, a part of the present invention, and will only briefly be described.

Cooperating with the extracting cylinder 5 is a kicker roll, 13, for knocking back hulls carried up with the cotton engaged by the teeth of the cylinder, and a doffing cylinder, 14. The cotton doffer from cylinder 5 is projected onto a smaller extracting cylinder, 15, by the doffer 14, and a kicker roll, 16, cooperates with the cylinder 15. The cotton is doffed from extracting cylinder 15 by a doffer, 17, located beneath it, and after being forced over a curved screen, 18, by the doffer is delivered into a spout, 19, which in turn delivers the cotton to the gin, on which the machine is intended to be mounted. The lower part of the extracting cylinder 5 is also surrounded by a curved screen, 20, and dirt and trash passing through the screens, 18 and 20, fall into a trough, 21, whence they are continuously delivered by a rotary member, 22, to the trash conveyor 12. The rotary member 22 also delivers to the trash conveyor the hulls knocked over the upper end of hull board 10 by the reclaiming cylinder 8, as later described.

Referring now specifically to the reclaiming cylinder 8, a novel feature in its construction consists in having the teeth, 23, of the saws thereof spaced considerably further apart than the teeth of the saws of the extracting cylinder, as will be apparent from comparing the two cylinders, as illustrated in the drawing. With the extracting cylinder, the teeth must be close enough together to permit two or more of the teeth to firmly engage each lock of cotton so that it will not be pulled loose from the teeth when it is acted upon by the kicker roll 13 in knocking back the hulls which may be passing beneath it with the locks; otherwise, if the locks were torn loose from the teeth, linting or ginning of the cotton would result.

Aside from the importance of having two or more teeth of the extracting cylinder engage and firmly hold each lock of cotton against the action of the kicker roll, it is also important to have the spaces between the teeth close enough to prevent hulls entering between the teeth, which would result in the hulls being unnecessarily cut or shaled by the action of the kicker roll. On the other hand, if the teeth of the reclaiming saw cylinder are spaced as closely together as they should be for an extracting cylinder, they do not have sufficient action in engaging and throwing over the upper edge of the hull board the large hulls, flared bolls, foreign matter, et cetera, which cannot escape through the space past the lower edge of the hull board. By having relatively wide spaces between the teeth of the reclaiming cylinder, the teeth can get a better hold on the large hulls and the like for throwing them over the top of the hull board without having any greater tendency to throw one-seed lock cotton that is not acted upon or disturbed in any way by the action of a kicker roll. It may be stated that this difference in the spacing of the teeth required for the highest efficiency of the extracting and reclaiming cylinder, respectively, is one of the reasons why the single cylinder of the machine of Patent No. 1,030,913, is inadequate for present-day requirements.

I have heretofore referred to the fact that the reclaiming cylinder is preferably rotated so as to have a slower peripheral speed than the extracting cylinder. There is, of course, no direct cooperation between these two cylinders in the present arrangement, and the difference in speed between the two cylinders is provided for the reason that a relatively high peripheral speed of the extracting cylinder is required to secure the best results in cooperation with the kicker roll, and this speed is greater than that required for the reclaiming cylinder to secure the best reclaiming results. This, of course, is due to the fact that the reclaiming cylinder has no cooperating kicker roll.

In operation, the mixed cotton and hulls fed into the machine are forced over the screen 4 and propelled over the slide 6 at relatively high velocity by the directing cylinder 3. The hulls, cotton and cotton locks are thrown directly against the rising side of the extracting cylinder with the result that all of the free cotton and a majority of the cotton locks are engaged by the teeth of the extracting cylinder and carried upward beneath the kicker roll 13 which knocks back any hulls carried up by the cotton. The doffer 14 removes the cotton and any hulls entangled with it from the extracting cylinder and projects the same against the smaller extracting cylinder 15, the kicker roll 16 knocking back any hulls from the cotton. These hulls, together with any dirt or trash separated from the cotton, and also any cotton or cotton locks which may escape past the extracting cylinder 15, fall onto the screen 20, and are carried over the same by the extracting cylinder 5, small trash and dirt falling through the screen 20. The cotton may be engaged and again carried around by the extracting cylinder, while the hulls, and any cotton locks not so engaged, will be discharged from the end of the screen and fall upon the hull board 10. The space 9 is sufficient in width to permit the free escape therethrough of hulls and of any locks of cotton not engaged by the teeth of the extracting cylinder 5. Such hulls and locks of cotton fall through the space 9 onto the hull board 10, the lower end of which is adjusted sufficiently close to the rising side of the reclaiming cylinder 8 to prevent the escape through the space 11 of any locks of cotton, while permitting the free escape of small hulls and hull particles therethrough. The teeth 23 of the reclaiming cylinder will engage these locks of cotton and carry them around beneath the doffer 7, which will remove them. The doffer is surrounded, on its outer and upper side by a shield 24, and the removed cotton locks are carried around beneath this shield and projected by the doffer against the teeth of the extracting cylinder 5. The larger hulls falling onto the hull board 10 will be engaged and knocked upward and over the top of the hull board and fall into the trough 21. In further explanation of this operation, it may be explained that the percentage of hulls falling on the hull board 10 is far greater than that of the cotton locks; so that, even with the lesser number of teeth on the reclaiming cylinder than has characterized these cylinders in the past, there are a sufficient number of teeth to engage all of the cotton locks presented, while many of the teeth are left free to engage the large hulls and knock them by impact over the top of the hull board. The operation, however, is not confined to the action of bare teeth on the hulls, as an engaged lock coming in contact with a hull will naturally knock the same upward. However, it is believed the majority of hulls are knocked over the top of the hull board by the bare teeth.

It is furthermore to be noted that the action of knocking the large hulls over the top of the hull board could not be performed with any high degree of efficiency, were it not for the relatively wide spacing between the teeth of the reclaiming cylinder. These spaces permit the large hulls to enter between the teeth so that the latter may directly engage the same and throw them upward and outward. If the teeth of the reclaiming cylinder, as in former constructions, were spaced as close together as the teeth of the extracting cylinder, the normal action occurring in the majority of contacts between the teeth and the hulls would simply be to throw the hulls outward, or off of, the cylinder, as the closely spaced teeth have very little opportunity of engaging the hulls.

Finally, it is to be noted that while the upper edge of the hull board 10 may be held in practically a fixed position, its lower edge is made adjustable to and from the reclaiming cylinder, as shown, to increase or decrease the space through which hulls and trash discharge. This is for the reason that, when handling small-lock cotton, the hulls are correspondingly small, making it necessary to restrict the size of the space to prevent the loss of such cotton; but when handling cotton containing comparatively large hulls, the space can be increased to permit the free discharge of such hulls without waste, since the cotton-locks are correspondingly larger.

I claim:

1. In a cotton extracting, cleaning and reclaiming machine, in combination with an extracting cylinder adapted to receive a mixed stream of cotton and hulls directed against its rising side and having a kicker roll cooperating therewith, a reclaiming cylinder rotating in an opposite direction to the extracting cylinder for recovering cotton from cotton and hulls escaping past the latter, positioned to receive said escaping cotton and hulls on its rising side and provided with a hull board facing its rising side, the lower edge of which defines, with the side of the reclaiming cylinder the size of a space past the latter for the escape of hulls, and the top of said hull board being positioned at such distance from the reclaiming cylinder as to prevent cotton from being thrown over it by the reclaiming cylinder, but being close enough to said cylinder to permit the teeth thereof by impact to throw over said top hulls, flared bolls, and the like, that are too large to escape through the space past the lower edge of the hull board.

2. In a cotton extracting, cleaning and reclaiming machine, in combination with an extracting cylinder adapted to receive a mixed stream of cotton and hulls directed against its rising side and having a kicker roll cooperating therewith, a reclaiming cylinder rotating in an opposite direction to the extracting cylinder at a slower peripheral speed for recovering cotton from cotton and hulls escaping past the latter, positioned to receive said escaping cotton and hulls on its rising side and provided with a hull board facing its rising side, the lower edge of which defines, with the side of the reclaiming cylinder, the size of a space past the latter for the escape of hulls, and the top of said hull board being positioned at such distance from the reclaiming cylinder as to prevent cotton from being thrown over it by the reclaiming cylinder, but being close enough to said cylinder to permit the teeth thereof by impact to throw over said top hulls, flared bolls, and the like, that are too large to escape through the space past the lower edge of the hull board.

3. In a cotton extracting, cleaning and reclaiming machine, in combination with an extracting cylinder adapted to receive a mixed stream of cotton and hulls directed against its rising side and having a kicker roll cooperating therewith, a reclaiming cylinder rotating in an opposite direction to the extracting cylinder for recovering cotton and hulls escaping past the latter, positioned to receive said escaping cotton and hulls on its rising side and provided with a hull board facing its rising side, the lower edge of which defines, with the side of the reclaiming cylinder, the size of a space past the latter for the escape of hulls, and the top of said hull board being positioned at such distance from the reclaiming cylinder as to prevent cotton from being thrown over it by the reclaiming cylinder, but being close enough to said cylinder to permit the teeth thereof by impact to throw over said top hulls, flared bolls, and the like, that are too large to escape through the space past the lower edge of the hull board, and a doffing cylinder associated with said reclaiming cylinder for removing cotton therefrom and delivering it back to the rising side of said extracting cylinder.

4. In a cotton extracting, cleaning and reclaiming machine, in combination with an extracting cylinder adapted to receive a mixed stream of cotton and hulls directed against its rising side and having a kicker roll cooperating therewith, a reclaiming cylinder rotating in an opposite direction to the extracting cylinder for recovering cotton from cotton and hulls escaping past the latter, positioned to receive said escaping hulls and cotton on its rising side, and provided with a hull board facing its rising side, the lower edge of which defines, with the side of the reclaiming cylinder, the size of a space past the latter for the escape of hulls, and the top of said hull board being positioned at such distance from the reclaiming cylinder as to prevent cotton from being thrown over it by the reclaiming cylinder, but being close enough to said cylinder to permit the teeth thereof by impact to throw over said top hulls, flared bolls, and the like, that are too large to escape through the space past the lower edge of the hull board, a doffing cylinder associated with the upper side of said reclaiming cylinder and rotating in an opposite direction thereto for removing cotton therefrom and delivering it back to the rising side of said extracting cylinder.

5. In a cotton extracting, cleaning and reclaiming machine, in combination with an extracting cylinder adapted to receive a mixed stream of cotton and hulls, a slide for directing said stream against the rising side of the extracting cylinder, a kicker roll cooperating with said cylinder, a reclaiming cylinder for recovering cotton from cotton and hulls escaping past the extracting cylinder and provided with a hull board, the lower edge of which defines, with the side of the reclaiming cylinder, the size of a space past the latter for the escape of hulls, and the top of said hull board being positioned at such distance from the reclaiming cylinder as to prevent cotton from being thrown over it by the reclaiming cylinder, but being close enough to said cylinder to permit the teeth thereof by impact to throw over said top hulls, flared bolls, and the like, that are too large to escape through the space past the lower edge of the hull board, and a doffing cylinder associated with the upper side of said reclaiming cylinder for removing cotton therefrom and projecting it onto the rising side of said extracting cylinder, said slide, and the side of said doffer rotating opposite the extracting cylinder defining therewith a space for the passage of hulls and cotton past the extracting cylinder to the reclaiming cylinder.

6. In a cotton extracting, cleaning and reclaiming machine, in combination with an extracting cylinder adapted to receive a mixed stream of cotton and hulls directed against its rising side and having a kicker roll cooperating therewith, a reclaiming cylinder for recovering cotton from cotton and hulls escaping past the extracting cylinder, positioned to receive said escaping hulls and cotton on its rising side, and having teeth separated a greater distance than the teeth of the extracting cylinder, a hull board cooperating with said reclaiming cylinder on its rising side, the lower edge of which defines, with the side of reclaiming cylinder, the size of a space past the latter for the escape of hulls, and the top of said hull board being positioned at such distance from the reclaiming cylinder as to prevent cotton from being thrown over it by the reclaiming cylinder, but being close enough to said cylinder to permit the teeth thereof by impact to throw over said top hulls, flared bolls and the like, that are too large to escape through the space past the lower edge of the hull board.

7. Reclaiming mechanism for a cotton extracting and cleaning machine comprising, in combination with an extracting saw cylinder past which hulls, and cotton not engaged thereby are adapted to escape, a reclaiming cylinder positioned to receive said escaping hulls and cotton on its rising side, and having teeth spaced from each other a greater distance than the teeth of the extracting cylinder, and a hull board cooperating with said reclaiming cylinder, the lower edge of which is positioned to permit the escape of small hulls past the reclaiming cylinder, and the top of which is positioned to permit hulls, flared bolls and the like, that are too large to escape past said lower edge, to be knocked thereover by the teeth of the reclaiming cylinder.

8. Reclaiming mechanism for a cotton extracting and cleaning machine comprising, in combination with an extracting saw cylinder past which hulls, and cotton not engaged thereby are adapted to escape, a reclaiming cylinder positioned to receive said escaping hulls and cotton on its rising side, and having teeth spaced from each other a greater distance than the teeth of the extracting cylinder, a hull board cooperating with said reclaiming cylinder, the lower edge of which is positioned to permit the escape of small hulls past the reclaiming cylinder, and the top of which is positioned to permit hulls, flared bolls and the like, that are too large to escape past said lower edge, to be knocked thereover by the teeth of the reclaiming cylinder, and a doffing cylinder associated with the upper side of said reclaiming cylinder for removing cotton therefrom and projecting it toward said extracting cylinder.

9. Reclaiming mechanism for a cotton extracting and cleaning machine comprising, in combination with an extracting saw cylinder past which hulls, and cotton not engaged thereby are adapted to escape, a reclaiming cylinder rotating in the opposite direction to the extracting cylinder positioned to receive said escaping hulls and cotton on its rising side, and provided with a hull board, the lower edge of which defines one side of a space past the lower rising side of the cylinder and the top of which extends far enough away from its cylinder to prevent cotton from being thrown over it, but close enough to permit the teeth of the cylinder to throw over said top the hulls, flared bolls and the like, that are too large to escape through the space past the lower edge of the board.

10. In a cotton extracting, cleaning and reclaiming machine in combination with an extracting saw cylinder provided with teeth located relatively close together, a kicker roll co-operating with said cylinder, means for directing a mixed stream of cotton and hulls against the rising side of said cylinder, a reclaiming saw cylinder rotating in a direction opposite to that of the extracting cylinder for recovering cotton from cotton and hulls escaping past the extracting cylinder and provided with teeth spaced relatively wide apart, to promote impact action between said teeth and hulls engaged thereby, and means for directing the hulls and cotton escaping past the extracting cylinder to the rising side of the reclaiming cylinder, and over which hulls are adapted to be knocked by impact therewith of the teeth of the reclaiming cylinder.

11. In a cotton extracting, cleaning and reclaiming machine, in combination with an extracting cylinder having teeth located relatively close together, a kicker roll co-operating with said cylinder, means for directing a stream of mixed cotton and hulls toward the rising side of said cylinder and defining with said side a space for the escape past the extracting cylinder of hulls, and of lock cotton not engaged by the extracting cylinder, a reclaiming saw cylinder rotating in an opposite direction to the extracting cylinder and having teeth spaced relatively wide apart, a doffing cylinder rotating in the opposite direction to the reclaiming cylinder for removing cotton therefrom and delivering it onto the rising side of the extracting cylinder, the down-going side of said doffing cylinder forming a boundary on one side for a continuation of the space extending past the extracting cylinder, the relative position of the parts being such that cotton locks and hulls escaping past the extracting cylinder will fall through said space to the rising side of the reclaiming cylinder, and a hull board cooperating with said reclaiming cylinder, over which hulls are adapted to be knocked by impact therewith of the teeth of the reclaiming cylinder.

12. A cotton extracting, cleaning and reclaiming machine according to claim 1, in which the lower edge of the hull board is adjustable toward and from the reclaiming cylinder.

JOHN E. MITCHELL.